Dec. 19, 1939.   H. D. GEYER   2,184,186
SEALING STRIP FOR AUTOMOBILE WINDOWS
Filed Jan. 16, 1937
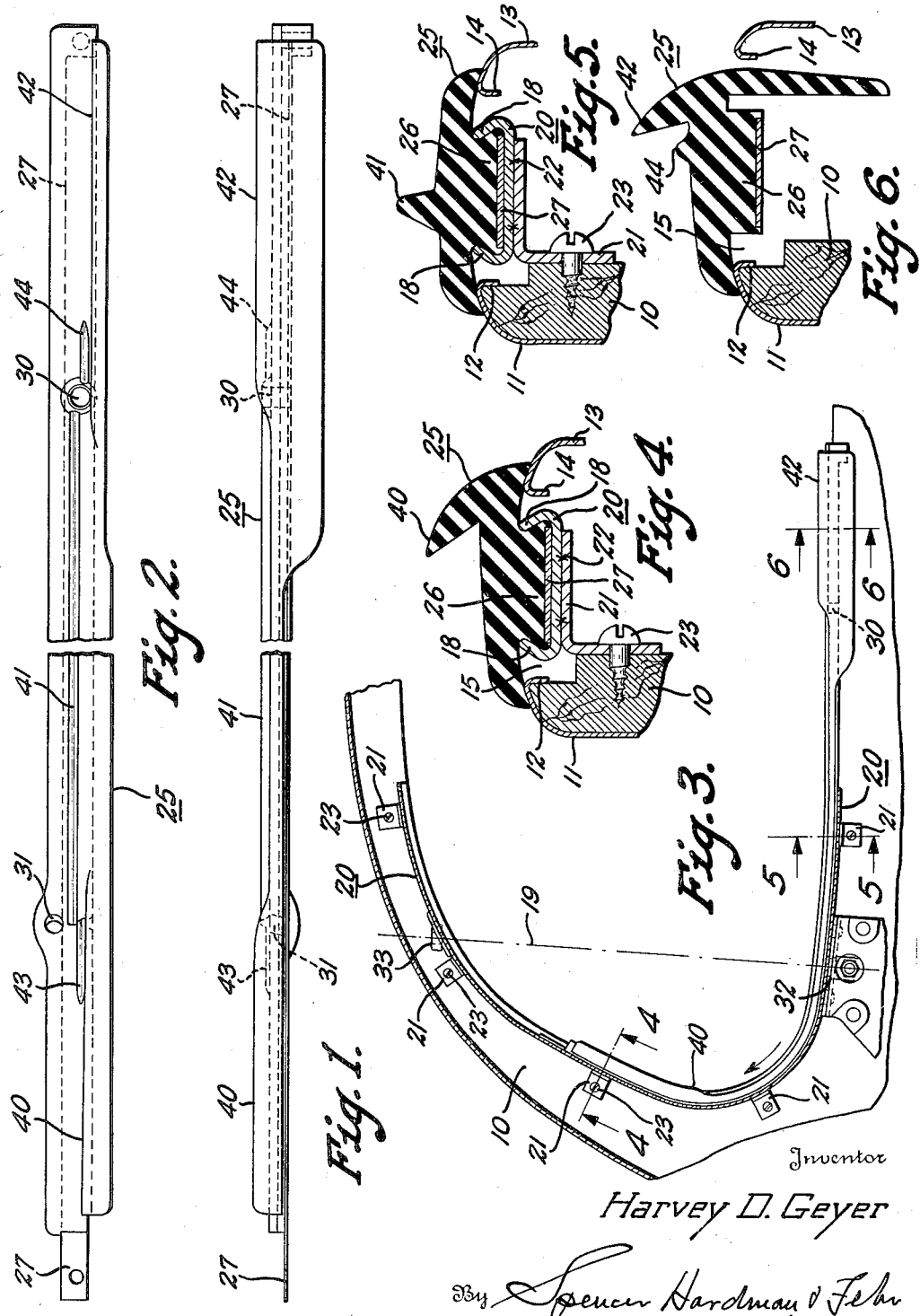
Inventor
Harvey D. Geyer
By Spencer Hardman & Fehr
his Attorneys Patented Dec. 19, 1939

2,184,186

UNITED STATES PATENT OFFICE 2,184,186

SEALING STRIP FOR AUTOMOBILE WINDOWS

Harvey D. Geyer, Dayton, Ohio, assignor to General Motors Corporation, Detroit, Mich., a corporation of Delaware Application January 16, 1937, Serial No. 120,896

3 Claims. (Cl. 296—44)

This invention relates to resilient rubber weatherstrips for door or window openings in general and especially to a weatherstrip to seal movable ventilating windows such as are now in wide use in closed automobile bodies.

Resilient rubber weatherstrips are now used on automobile windows and have resilient rubber flanges which are compressed against the movable portion of the window to seal the crack between the window and its stationary frame. Heretofore such rubber weatherstrips have been retained in place upon the edge of the window opening in various ways but no entirely satisfactory way has been devised heretofore since often the operation of the movable windows exerts a severe stress thereupon and tends to twist or pull or otherwise urge the flexible rubber strips loose from the edge of the window frame.

The object of this invention is to provide an improved flexible rubber weatherstrip and retaining means therefor for more positively holding the rubber strip in its proper place at all times in a very efficient and simple manner.

A further object of this invention is to provide a very efficient and economical method of assembling the sealing portion of the weatherstrip to the window opening without relying upon the use of cement or other adhesive.

Further objects and advantages of the present invention will be apparent from the following description, reference being had to the accompanying drawing wherein a preferred embodiment of the present invention is clearly shown.

In the drawing:

Fig. 1 is a side elevation of a flexible composite weatherstrip as molded in straight lengths according to this invention.

Fig. 2 is a plan view of Fig. 1, that is, looking toward the face of the strip which abuts the window.

Fig. 3 illustrates the method of assembling the strip of Fig. 1 by sliding it lengthwise into a retaining channel either before or after said retaining channel has been fixed to the inner edge of the window opening. The window structure shown is on the right front door of an automobile, the hinged glass ventilator window panel being omitted.

Fig. 4 is a section on line 4—4 of Fig. 3, and shows the composite strip firmly retained in place by the metal retaining channel.

Fig. 5 is a section on line 5—5 of Fig. 1, and is similar to Fig. 4 except at this section the upwardly projecting resilient rubber flange is of different shape and lies on the opposite side of the vertically hinged glass window panel as later assembled thereupon.

Fig. 6 is a section on line 6—6 of Fig. 1, and shows the free end of the composite strip projecting beyond the end of the stationary retaining channel into which said composite strip is being slid lengthwise.

Similar reference characters refer to similar parts thruout the drawing.

10 designates the frame of the automobile door which has been chosen to illustrate this invention. This frame 10 extends substantially around the window opening as shown in Figs. 3, 4, and 5 and may be made from wood or metal and forms part of the rigid frame work of the door.

11 designates the outside metal panel which fits snugly against the frame 10 and has a flange 12 turned down around the edge of frame 10 which edge forms the window opening.

13 designates the inside metal panel which has an inwardly turned flange 14 extending around the window opening. Metal panel 13 may be held fixed in place to the door structure in any suitable manner not illustrated in the drawing. The gap between metal flanges 12 and 14 provides an open space 15 of uniform width extending around the window opening.

The preformed relatively rigid retaining channel 20, preferably of steel, is suitably fixed in place to the door structure so that channel 20 extends around the inner edge of the opening for the hinged window panel which is to be hinged about the substantially vertical axis 19. For so fixing channel 20 in place, it may have a series of angle brackets 21 spot-welded thereto in spaced relation as shown at 22, and these brackets 21 may be fixed to the stationary frame 10 by any suitable means such as by screws 23, all as clearly shown. Of course any other suitable means may be used to fix channel 20 in place around the edge of the window opening, it being necessary only that the interior channel portion thereof be left free and unobstructed from end to end thereof for a purpose hereinafter disclosed.

The composite resilient rubber and metal weatherstrip 25, shown in Figs. 1 and 2, is molded preferably in straight lengths and is so flexible that it may be slid or pulled lengthwise into place into the curved channel 20. Preferably the composite strip 25 is slid into its retaining channel 20 before said channel 20 is fixed to the door as above described. The resilient rubber portion of this composite strip 25 may be molded in any desired shape at any portion of its length to provide the desired resilient sealing flanges which bear upon the swinging window panel, but preferably is molded with a resilient rubber base portion 26 of uniform section thruout its length (see Fig. 6) and a flexible metal strip 27, preferably steel, is firmly bonded to the rubber portion 26 preferably by a vulcanized bond, which can be easily obtained by using strip 27 as an insert in the vulcanizing mold during the vulcanization of the rubber strip. The molded constant section of the rubber base portion 26 and its metal strip 27 is shown in Fig. 6. The metal strip 27 has such a width that it may be easily slid lengthwise into the dove-tail channel 20 but cannot be pulled transversely from this channel 20 due to its inturned flanges 18. The soft rubber portion 26 has such a width that it may be quite easily slid lengthwise of channel 20 when wet with a soap solution or similar lubricant to make it slide more easily, but after complete assembling of these parts the rubber portion 26 will have a snug fit within channel 20. Preferably the longitudinal edges of metal strip 27 are covered with the soft rubber (see Fig. 6) so that after said rubber base portion 26 is soaped for assembling upon channel 20 there will be less friction during such assembling.

The metal strip 27 serves two important functions, namely: it gives the composite strip 27 substantial rigidity or non-stretchability against endwise compression or tension so that it may be forced or pulled endwise into the retaining channel 20 without puckering or kinking at any point; also it locks the base portion 26 in the dove-tail channel 20 so that it cannot be pulled transversely from the channel 20 during use.

Composite strip 25 is provided with suitable holes 30 and 31 therein which after assembling upon channel 20 properly register with the hinge pin bearings 32 and 33 respectively along the axis 19 for the swinging window panel (not shown).

Bearings 32 and 33 are fixed in any suitable manner to the frame 10.

The composite strip 25 must be fully inserted to its final position in channel 20 prior to the time any hinge pins or pintles are inserted in bearings 32 and 33, which pins or pintles project into the open space in channel 20 thru which strip 25 must slide during assembling. The holes 30 and 31 obviously may be easily molded in any required position or angle in the straight composite strip 25 so that after assembly upon channel 20 these holes will be located exactly as desired and aligned with the axis 19. In the form illustrated in Fig. 2, hole 31 is substantially offset and lies to one side of the flexible metal strip 27, while hole 30 extends thru said metal strip. Obviously the exact location and angle of the axes of both holes 30 and 31 in the straight strip 25 is first determined and the straight strip 25 so made that, when it is subsequently slid into its curved retaining channel 20, the final position of strip 25 will cause holes 30 and 31 to be aligned along the axis 19 and ready to receive the hinge pins when the swinging window panel is subsequently assembled upon the hinge bearings 32 and 33. The axis 19 ordinarily passes also thru the metal channel 20, in which event suitable holes or cut-away openings are provided in channel 20 to permit the hinge pins to clear channel 20 and pass into their bearings 32 and 33.

The molded rubber portion of strip 25 is provided with flexible rubber sealing flanges 40 and 42 which abut the inside surface of the margin of the swinging glass panel (not shown). The flexible rubber sealing flange 41 abuts the outside surface of the margin of that portion of the swinging glass panel which lies forward of the axis 19 and is arranged to swing inwardly from the plane of the door. Obviously these sealing flanges 40, 41 and 42 may be readily molded to any desired width or sectional shape to give the desired pressure and sealing action against the swinging glass panel when it is in closed position.

In addition to these main sealing flanges 40, 41 and 42 there are preferably provided adjacent the two hinge points relatively small auxiliary sealing flanges, such as shown at 43 and 44 in Fig. 2, which are sufficiently short for the swinging glass panel to ride thereover by slightly flattening same during such swinging movement. Such auxiliary sealing flanges 43 and 44 serve to provide a better sealing action adjacent the hinge points since the main sealing flanges 40, 41 and 42 can not mutually overlap but a very short distance due to the desired swinging action of the swinging panel. These auxiliary sealing flanges 43 and 44 further serve the important function of pressing tightly against the swinging panel at all times regardless of its open or closed position, and thus serve as a friction means to prevent rattling of the swinging panel as will be obvious from the drawing.

While the embodiment of the present invention as herein disclosed, constitutes a preferred form, it is to be understood that other forms might be adopted, all coming within the scope of the claims which follow.

What is claimed is as follows:

1. A weatherstrip for a door or window opening, comprising: a resilient rubber strip having a relatively narrow width base portion and a correspondingly narrow longitudinally extending metal strip bonded to said base portion, a longitudinally curved metal retaining channel fixed to the edge of said opening, said metal strip being of such flexibility as to be readily slidable endwise thru the curves in said channel and having a locked fit within said channel, whereby said rubber strip is firmly but yieldingly secured to said opening.

2. A weatherstrip for a door or window opening, comprising: a quite flexible composite strip having one or more resilient rubber sealing flanges and a relatively narrow width rubber base portion bonded by vulcanization to a flexible metal base strip, a longitudinally curved retaining channel fixed to the inner peripheral edge of said opening, the narrow base portion of said flexible composite strip being inserted lengthwise into said retaining channel with a snug fit, whereby said composite strip is firmly but yieldingly secured to the edge of said opening.

3. A weatherstrip for a door or window opening, comprising: a quite flexible composite strip having one or more resilient rubber sealing flanges and a relatively small depth resilient rubber base portion bonded to a flexible metal strip, a relatively rigid longitudinally curved retaining member fixed to the inner edge of said opening and having a retaining groove therein into which said flexible metal strip may be readily inserted lengthwise around the curved portions thereof due to the flexibility of said composite strip, whereby said flexible composite strip is given its final curved form and firmly secured in place around the edge of said opening.

HARVEY D. GEYER.